(12) United States Patent
Raney et al.

(10) Patent No.: US 6,948,479 B1
(45) Date of Patent: Sep. 27, 2005

(54) INLINE PULSATION DAMPER SYSTEM

(75) Inventors: Michael R. Raney, Mendon, NY (US);
Eugen Maier, Clarkson, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/931,909

(22) Filed: Sep. 1, 2004

(51) Int. Cl.[7] ................................................. F15B 1/04
(52) U.S. Cl. ...................... 123/456; 123/467; 123/468; 138/30; 138/26
(58) Field of Search ............................... 123/456, 467, 123/468, 469; 138/26, 30

(56) References Cited

U.S. PATENT DOCUMENTS

| | | | | |
|---|---|---|---|---|
| 3,665,967 A | * | 5/1972 | Kachnik | 138/137 |
| 4,649,884 A | * | 3/1987 | Tuckey | 123/457 |
| 4,651,781 A | * | 3/1987 | Kandelman | 138/30 |
| 4,660,524 A | * | 4/1987 | Bertsch et al. | 123/468 |
| 5,511,528 A | * | 4/1996 | Iwanaga et al. | 123/467 |
| 5,516,266 A | * | 5/1996 | Talaski | 417/540 |
| 6,148,798 A | * | 11/2000 | Braun et al. | 123/467 |
| 6,354,273 B1 | * | 3/2002 | Imura et al. | 123/467 |
| 6,431,149 B1 | * | 8/2002 | Schwegler et al. | 123/467 |

* cited by examiner

Primary Examiner—Weilun Lo
(74) Attorney, Agent, or Firm—Jimmy L. Funke

(57) ABSTRACT

A hydraulic pulsation damper system for installation into an otherwise rigid hydraulic system to absorb and extinguish pressure pulsations being transmitted through the system by hydraulic fluid contained therein. The system is useful in suppressing pulsations in automotive fuel lines supplying fuel to fuel injection systems. The system includes fuel-conducting tubing made of flexible, non-permeable material that includes a convoluted central portion capable of expanding and contracting in response to pulsations in the fuel. Resilient foam is molded around the convoluted portion for controlling expansion of the convolutions. The foam and convoluted tubing are contained within a housing made from a larger-diameter hose having ends sealed as by swaged connectors. The damper system may be bent to accommodate installation with a fuel line in an engine and can conveniently provide a sound-deadening link in the fuel line of a vehicle between a body-mounted portion and an engine-mounted portion thereof.

10 Claims, 1 Drawing Sheet

INLINE PULSATION DAMPER SYSTEM

TECHNICAL FIELD

The present invention relates to dampers for limiting pressure pulsation transmission in hydraulic lines; more particularly, to passive dampers that suppress transmission of pulsations by resilient absorption of pulsation energy; and most particularly, to a damper for suppressing transmission of pressure pulsations in a fuel line supplying fuel injectors of an internal combustion engine.

BACKGROUND OF THE INVENTION

Fuel-injected internal combustion engines are well known. It is known in the art relating to engine fuel injection systems to provide pulse dampers for reducing the noise and vibration caused by pressure pulsations in fuel lines, particularly in lines feeding individual injectors and pressurized inlet lines for high pressure fuel pumps supplying fuel for direct cylinder injection. It is known that pulsations generated by the actuation of the fuel injectors can be transmitted from the engine to the body of a vehicle by a prior art rigid fuel line extending therebetween, causing the fuel line to vibrate against the body of the vehicle and thereby generate audible and undesirable noise.

Various forms of dampers are known in the art of pulsation suppression, including expansion chambers, accumulators of gas charges, spring pistons, and spring diaphragms. However, such devices can be bulky, can be relatively costly, and may require recharging or other servicing during their anticipated life span. Thus, such pulsation dampers typically are omitted from automotive engines, and the resulting noise and vibration are either avoided or quieted in other ways or are accepted as normal with injection systems. What is needed in the art is an improved, lower cost, compact, pulsation damper system suitable for use in automotive fuel systems.

It is a principal object of the present invention to suppress transmission of pulsations through a hydraulic line.

It is a further object of the invention to suppress transmission of noise created by engine fuel injector operation through a fuel line supplying the fuel injectors.

SUMMARY OF THE INVENTION

Briefly described, a hydraulic pulsation damper system in accordance with the invention, when installed into an otherwise rigid hydraulic system, provides a region of high-response, variable volume for absorbing and extinguishing pressure pulsations being transmitted through the system by the hydraulic fluid contained therein. Such a system, when used for suppressing pulsations in automotive fuel lines supplying fuel to automotive injection systems, includes fuel-conducting tubing made of any suitably flexible and fuel non-permeable material, such as, for example, polytetrafluoroethylene (PTFE). The tubing includes a convoluted (accordionated) central portion capable of expanding and contracting in volume in response to internal pressure pulsations in the hydraulic medium (e.g., fuel). Resilient foam, preferably of relatively high density, is molded around the accordionated portion for loading and thereby controlling expansion response of the tubing. The resilient foam and convoluted tubing preferably are contained within a housing that maintains the loading of the central portion by the resilient foam. Preferably, the housing is made from a larger-diameter hose having ends closed and sealed against leakage of fuel around inlet and outlet ends of the tubing, as by swaged connectors. The damper system is thus flexible and may be bent into a desired configuration to accommodate installation with the fuel line in an engine. The damper preferably is used to provide a flexible and sound-deadening link in the fuel line between a body-mounted portion and an engine-mounted portion of the fuel line.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
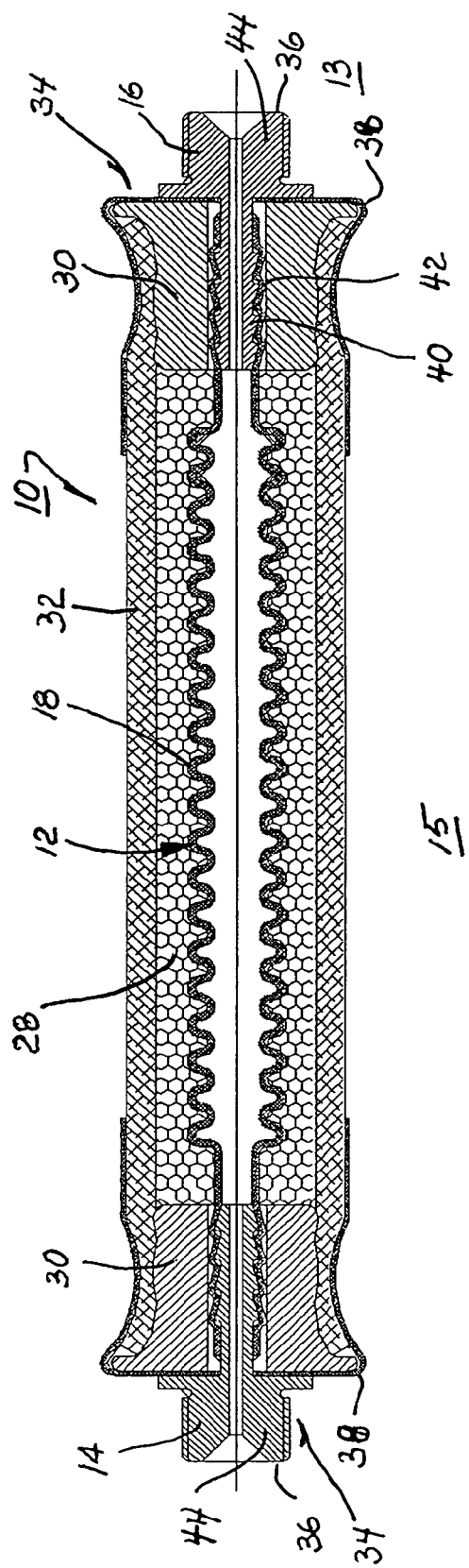
FIG. 1 is a longitudinal cross-sectional schematic view of a fuel line damper system in accordance with the invention.
Figure 2:
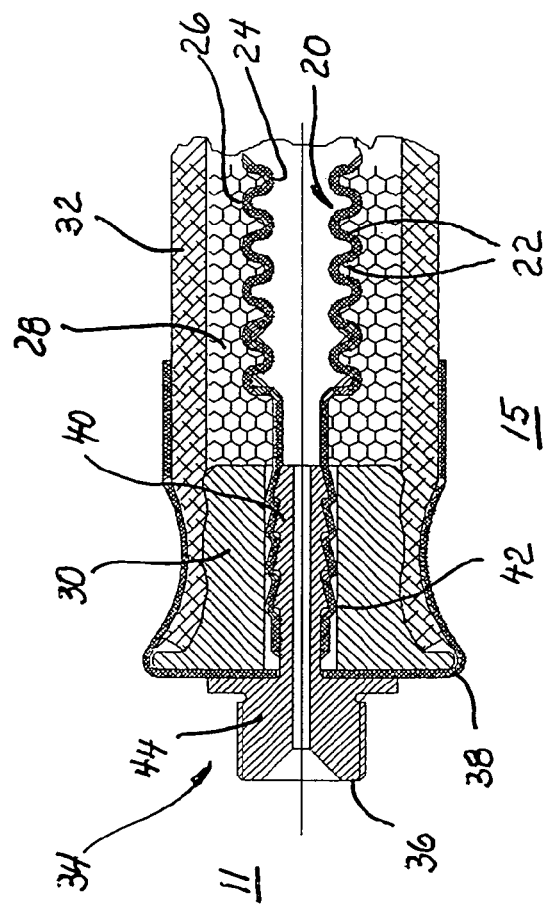
FIG. 2 is a detailed cross-sectional view of an end portion of a damper system, showing the interior construction.

Referring to FIGS. 1 and 2, numeral 10 generally indicates an exemplary embodiment of an inline hydraulic pulsation damper system in accordance with the invention. Damper system 10 includes hydraulic tubing element 12 having cylindrical inlet and outlet end portions 14, 16 at opposite ends of a flexible, convoluted central portion 18. The convoluted portion of tubing 12 is also referred to herein as "accordionated." Central portion 18 comprises a plurality of sequentially-connected ring-like convolutions 20 having opposite flexible sides 22 extending between inner and outer diameters 24, 26, respectively. The illustrated convolutions 20 are generally V-shaped in cross-section but they may be made with other configurations having sides capable of flexing to expand and contract the volume of central portion 18 in response to pressure pulsations within tubing 12. The inner and outer diameter bends at diameters 24, 26 may be sharp, discontinuous creases or smooth, continuous folds.

Tubing 12 may be formed of any flexible, resilient polymeric material suitable for conveying the hydraulic fluid of a particular application. For conveying gasoline, diesel, and/or alcohol, as may be required for automotive uses, a low-permeability, highly resistant polymer such as a fluorinated hydrocarbon, for example, polytetrafluoroethylene (PTFE), is preferred.

A resilient foam 28 is molded around accordionated portion 18 of tubing 12 in contact with sides 22 of the convolutions to load the sides inwardly and provide a resilient bias opposing outward pressure loading of the sides as results in use from the pumping of hydraulic fluid through tubing 12. Anti-crush end rings 30 are disposed around inlet and outlet ends 14, 16 of tubing 12 adjacent the ends of resilient foam 28. Preferably, resilient foam 28 is a so-called "high density" foam, formed of a polymer having a high degree of resilience.

Preferably, foam 28 and end rings 30 are contained radially within an outer cover or housing 32, which is preferably formed as a flexible member from material exemplarily of a reinforced rubber fuel hose. Housing 32 fits closely around foam 28 and end rings 30 and thereby limits outward expansion of the foam as may occur during absorption of pulsations by system 10. Housing 32 may be flexible to provide bendability of the damper as desired, or it may be made as a rigid member if bending is not needed.

The ends of damper 10 may be provided with end fittings 34, for example, hollow connectors 36 and caps 38 to close the ends of the housing against leakage of fuel or movement of the internal components. Connectors 36 may include inner ends 40 with angled barb elements 42 to grip the interior of the tube ends 14, 16 to hold the connectors in place and prevent fuel leakage around them. Outer ends 44 of the connectors 36 may form threaded tube fittings or equivalent means for connecting damper system 10 with tubes, hoses or connections (not shown) to convey fuel into and out of damper system 10. Caps 38 preferably are formed as sleeves that are swaged onto the ends of housing 32 and form fuel tight connections against the end rings 30, as shown in FIG. 2. The caps 38 may be part of or separately fixed to connectors 36 as shown in FIG. 2. If caps 38 are sealingly attached to connectors 36, as by welding, brazing, or other means, caps 38 may act as an outer seal to prevent fuel leakage from housing 32 if an internal leak should occur from tubing 12 into housing 32.

Embodiment 10 provides a compact inline hydraulic pulsation damper which is flexible and may readily form a portion of a fuel supply line for a pressurized fuel injector in an internal combustion engine or a fuel supply pump in a vehicle. Damper system 10 is readily deformable to meet the mounting requirements of various engine configurations.

In operation, pressure pulsations caused by intermittent fuel flow in an associated fuel supply system are damped by bulging out of sides 22 of tube convolutions 20 in response to pressure peaks in the fuel, and by subsequent springing back of the sides 22 under the resilient restorative force of foam 28, and of housing 32 if it is resilient, when the peak pressures are reduced. The damping process reduces both the noise generated by pulsing or hammer in the fuel lines and the vibration of the lines themselves due to the pressure pulses.

Pulsation damper system 10 is especially useful in suppressing pulsations in automotive fuel lines 11 supplying fuel from a fuel tank (not shown) mounted on a vehicle to automotive fuel injection systems mounted on an internal combustion engine 13. The damper system is thus flexible and may be bent into a desired configuration to accommodate installation with a fuel line in an engine 13. The damper system preferably is used to provide a flexible and sound-deadening link in the fuel line of a vehicle 15 between a body-mounted portion and an engine-mounted portion thereof.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An inline pulsation damper system for suppressing pulsations in a hydraulic fluid within the system, comprising:
    a) a tubing element having an inlet portion, an outlet portion, and a central portion therebetween, said central portion being convoluted to expand and contract in volume in response to said pulsations; and
    b) a resilient foam element disposed around at least said convoluted central portion for providing a restorative force to said volume expansions and contractions;
    said central portion comprising a plurality of sequentially-connected ring-like convolutions having opposite flexible sides extending between inner and outer diameters, said plurality of sequentially-connected ring-like convolutions having respective said inner and outer diameter sequentially alternate along a longitudinal axis of the tubing element.

2. A damper system in accordance with claim 1 further comprising a housing surrounding said resilient foam element.

3. A damper system in accordance with claim 2 wherein said housing is selected from the group consisting of flexible and non-flexible.

4. A damper system in accordance with claim 3 wherein said flexible housing contributes restorative force to said volume expansions and contractions in addition to said resilient foam element.

5. A damper system in accordance with claim 2 wherein said housing includes seals around said tubing inlet portion said tubing outlet portion.

6. A damper system in accordance with claim 1 wherein said tubing inlet portion and tubing outlet portion are engaged by connectors.

7. A damper system in accordance with claim 6 wherein said connectors include barb elements.

8. A damper system in accordance with claim 1 wherein at least said convoluted portion of said tubing is formed of a fluorinated hydrocarbon.

9. A damper system in accordance with claim 8 wherein said fluorinated hydrocarbon is polytetrafluoroethylene.

10. A fuel line pulsation damper system for suppressing pulsations in fuel being conveyed by a fuel line to an internal combustion engine, comprising:
    a) a tubing element having an inlet portion, an outlet portion, and a central portion therebetween, said central portion being convoluted to expand and contract in volume in response to said pulsations; and
    b) a resilient foam element disposed around at least said convoluted central portion for providing a restorative force to said volume expansions and contractions;
    said central portion comprising a plurality of sequentially-connected ring-like convolutions having opposite flexible sides extending between inner and outer diameters, said plurality of seguentially-connected ring-like convolutions having respective said inner and outer diameter sequentially alternate along a longitudinal axis of the tubing element.

\* \* \* \* \*